(12) United States Patent
Peng et al.

(10) Patent No.: US 8,264,783 B2
(45) Date of Patent: Sep. 11, 2012

(54) WIDE-ANGLE LENS SYSTEM HAVING SHORT OVERALL LENGTH

(75) Inventors: Fang-Ying Peng, Taipei Hsien (TW); Hai-Jo Huang, Taipei Hsien (TW); Sheng-An Wang, Taipei Hsien (TW); Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 133 days.

(21) Appl. No.: 12/975,294

(22) Filed: Dec. 21, 2010

(65) Prior Publication Data
US 2012/0105981 A1 May 3, 2012

(30) Foreign Application Priority Data

Oct. 29, 2010 (CN) .......................... 2010 1 0525060

(51) Int. Cl.
*G02B 13/04* (2006.01)

(52) U.S. Cl. ........................................ 359/753; 359/749
(58) Field of Classification Search .................. 359/749, 359/752, 753
See application file for complete search history.

(56) References Cited

U.S. PATENT DOCUMENTS

2012/0099211 A1* 4/2012 Peng et al. .................... 359/753

FOREIGN PATENT DOCUMENTS

CN 1186667 C 1/2005
* cited by examiner

*Primary Examiner* — David N Spector
(74) *Attorney, Agent, or Firm* — Altis Law Group, Inc.

(57) ABSTRACT

A lens system includes, in order from the subject side to the image side of thereof, a first lens group of negative refractive power, a second lends group of positive refractive power, and an image plane. The first lens group includes a first spherical lens, a second spherical lens, and a third spherical lens arranged in this order from the subject side to the image side of the lens system. The first spherical lens includes a first subject surface and a first image surface. The lens system satisfies the following formula: $8.9 < D/F_0 < 9.9$, wherein, D is the distance between an apex point of the first subject surface and the image plane along the optical axis of the lens system, $F_0$ is the effective focal length of the lens system.

11 Claims, 4 Drawing Sheets

WIDE-ANGLE LENS SYSTEM HAVING SHORT OVERALL LENGTH

BACKGROUND

1. Technical Field

The present disclosure relates to lenses and, particularly, to a wide-angle lens system with a short overall length.

2. Description of Related Art

Wide-angle lenses are used by camera modules in instant messaging devices providing digital display. However, when the field of view of the lens is greater than 90°, a number of lens groups must be used to correct aberrations and ensure image quality, which will increase the overall length of the wide-angle lens.

Therefore, it is desirable to provide a lens system which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
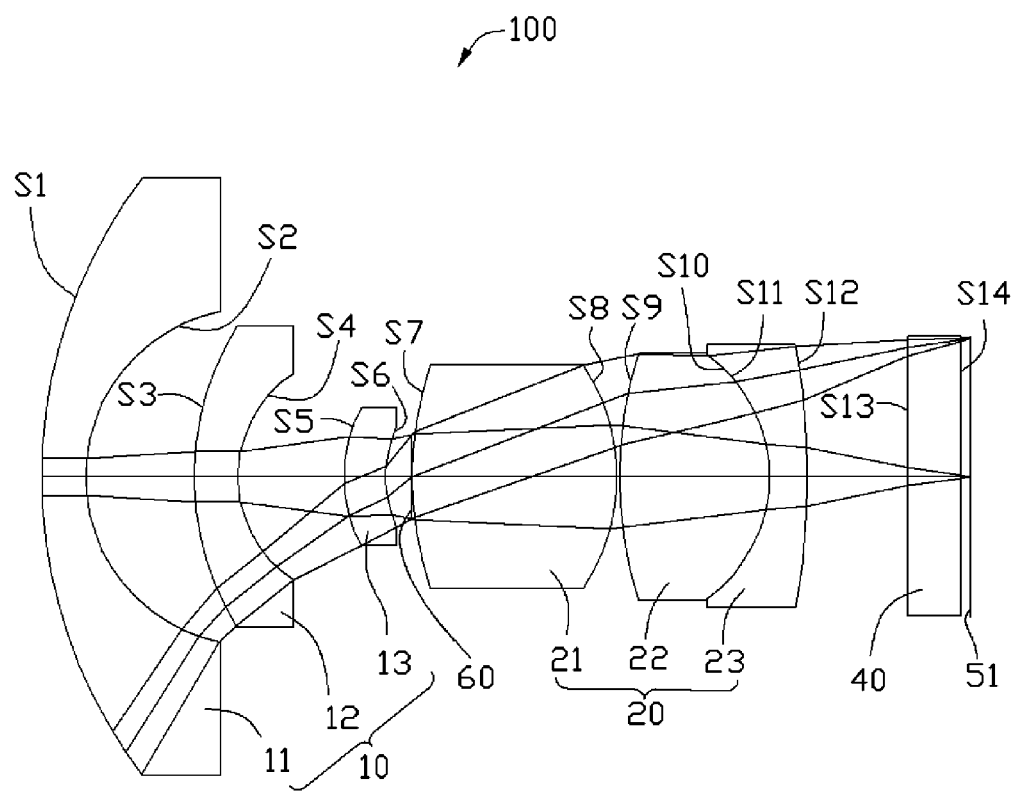
FIG. 1 is a schematic view of a lens system in one embodiment.

Referring to FIG. 1, one embodiment of a lens system 100 includes, in order from the subject side to the image side thereof, a first lens group 10 of negative refractive power, a second lens group 20 of positive refractive power, an infrared cut filter 40, and an image plane 51.

When capturing an image, incident light rays enter the lens system 100, transmit through the two lens groups 10, 20, the infrared cut filter 40, and reach the image plane 51.

The first lens group 10 includes, in order from the subject to the image side of the lens system 100, a first spherical lens 11 of negative refractive power, a second spherical lens 12 of negative refractive power, and a third spherical lens 13 of negative refractive power. The first spherical lens 11 includes a first subject-side surface 51 facing the subject side of the lens system 100 and a first image-side surface S2 facing the image side of the lens system 100. The second spherical lens 12 includes a second subject-side surface S3 facing the subject side of the lens system 100 and a second image-side surface S4 facing the image side of the lens system 100. The third spherical lens 13 includes a third subject-side surface S5 facing the subject side of the lens system 100 and a third image-side surface S6 facing the image side of the lens system 100.

The second lens group 20 includes, in order from the subject to the image side of the lens system 100, a fourth spherical lens 21 of positive refractive power, a fifth spherical lens 22 of positive refractive power, and a sixth spherical lens 23 of negative refractive power. The fourth spherical lens 21 includes a fourth subject-side surface S7 facing the subject side of the lens system 100 and a fourth image-side surface S8 facing the image side of the lens system 100. The fifth spherical lens 22 includes a fifth subject-side surface S9 facing the subject side of the lens system 100 and a fifth image-side surface S10 facing the image side of the lens system 100. The sixth spherical lens 23 includes a sixth subject-side surface S11 facing the subject side of the lens system 100 and a sixth image-side surface S12 facing the image side of the lens system 100. The fifth image-side surface S10 and the sixth subject-side surface S11 are adhered together.

In practice, an aperture stop 60 can be interposed between the first lens group 10 and the second lens group 20 (i.e. between the third spherical lens 13 and the fourth spherical lens 21) to limit the flux of light from the first lens group 10 to the second lens group 20, and thus the light cone of the light rays entering the second lens group 20 will be more symmetrical to control the coma occurring in the lens system 100 within a correctable range. In this embodiment, the aperture stop 60 is a ring made of opaque material and pasted on the fourth subject-side surface S7.

The infrared cut filter 40 includes a seventh subject-side surface S13 facing the subject side of the lens system 100 and a seventh image-side surface S14 facing the image side of the lens system 100.

To balance the overall length and the spherical aberration of the lens system 100, the lens system 100 satisfies the formula: (1) $8.9<D/F_0<9.9$, where D is the length between an apex point of the first subject-side surface S1 and the image plane 51 along the optical axis of the lens system 100, $F_0$ is the effective focal length of the lens system 100. Specifically, when $D/F_0<9.9$ is not satisfied, the attempt of shortening the overall length of the lens system 100 encounters a challenge, when $8.9<D/F_0$ is not satisfied, the spherical aberration occurring in the lens system 100 exceeds the correctable range. In this embodiment, D=14.842 mm, $F_0$=1.56 mm, $D/F_0$=9.514.

Also, the lens system 100 satisfies the formula: (2) $0.8<F_0/|F_{G1}|<0.9$, where $F_{G1}$ is the effective focal length of the first lens group 10. Specifically, when $F_0/|F_{G1}|<0.9$ is not satisfied, the chromatic aberrations occurring in the lens system 100 exceeds the correctable range, when $0.8<F_0/|F_{G1}|$ is not satisfied, the field curvature occurring in the lens system 100 exceeds the correctable range. In this embodiment, $F_0$=1.56 mm, $F_{G1}$=−1.8678 mm, $F_0/|F_{G1}|$=0.835.

Additionally, the lens system 100 satisfies the formula: (3) $3.5<|F_{L2}/F_0|<4.5$, where $F_{L2}$ is the effective focal length of the second spherical lens 12. Specifically, when $|F_{L2}/F_0|<4.5$ is not satisfied, the chromatic aberrations occurring in the lens system 100 exceeds the correctable range, when $3.5<|F_{L2}/F_0|$ is not satisfied, the spherical aberration occurring in the lens system 100 exceeds the correctable range. In this embodiment, $F_0$=1.56 mm, $F_{L2}$=−6.3165 mm, $|F_{L2}/F_0|$=3.828.

Additionally, the lens system 100 satisfies the formula: (4) v5−v6>35, where v5 is the Abbe number of the fifth spherical lens 22, v6 is the Abbe number of the sixth spherical lens 23. In this embodiment, the fifth image-side surface S10 and the sixth subject-side surface S11 are adhered together, to correct the chromatic aberrations occurring in the lens system 100 and optimize the optical performance of the lens system 100. In this embodiment, v5=54.68, v6=18.89, v5−v6=35.79.

The following symbols are used in the embodiment:

F/No: F number;

2ω: field angle;

R: radius of curvature;

D: distance between surfaces on the optical axis of the lens system 100;

Nd: refractive index of lens of d light (wavelength: 587.6 nm); and

Vd: Abbe number of d light (wavelength: 587.6 nm).

The lens system 100 of this embodiment satisfies the tables 1-2.

TABLE 1

| Surface | R(mm) | D(mm) | Nd | Vd |
|---|---|---|---|---|
| S1 | 7.907 | 0.7 | 1.816 | 46.626 |
| S2 | 2.697 | 1.733 | — | — |
| S3 | 4.546 | 0.7 | 1.618 | 63.33 |
| S4 | 1.98 | 1.697 | — | — |
| S5 | 2.399 | 0.66 | 1.755 | 27.512 |
| S6 | 1.94 | 0.424 | — | — |
| Aperture stop 60 | Infinity | 0 | — | — |
| S7 | 5.674 | 3.279 | 1.755 | 52.32 |
| S8 | −3.2 | 0.03 | — | — |
| S9 | 6.407 | 2.4 | 1.729 | 54.68 |
| S10 | −2.414 | 0.6 | 1.922 | 18.89 |
| S11 | −12.359 | 1.615 | — | — |
| S12 | −12.359 | 1.615 | — | — |
| S13 | Infinity | 0.85 | 1.5168 | 64.167336 |
| S14 | Infinity | 0.154 | — | — |
| Image plane 51 | Infinity | — | — | — |

TABLE 2

| $F_0$(mm) | F/No | 2ω |
|---|---|---|
| 1.56 | 2.5 | 163° |

Figure 2:
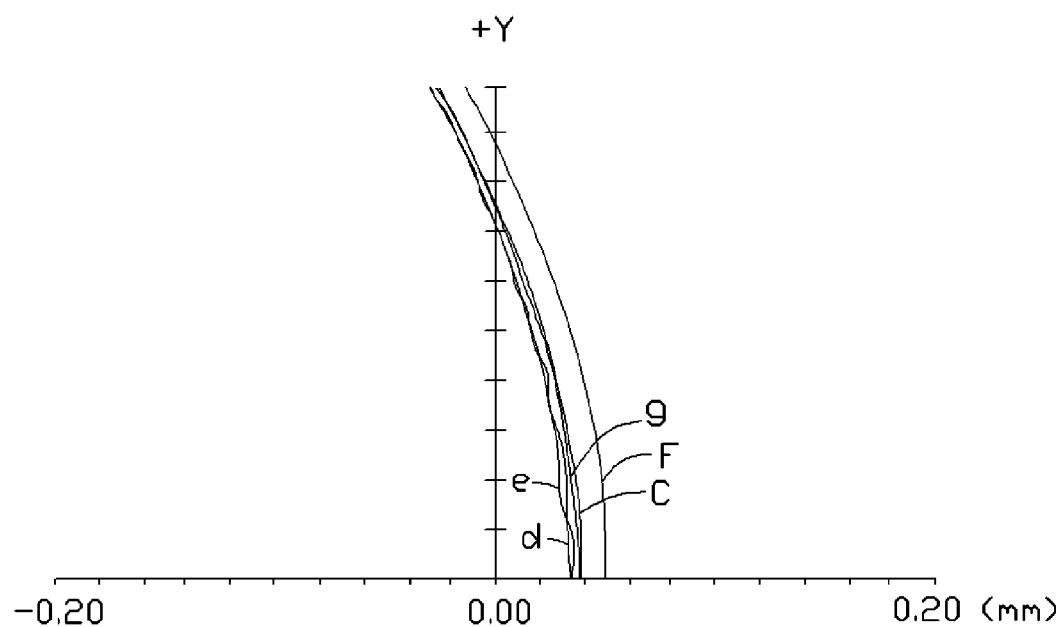
FIGS. 2-4 are graphs respectively showing spherical aberration, field curvature, and distortion in the lens system of FIG. 1.
Figure 3:
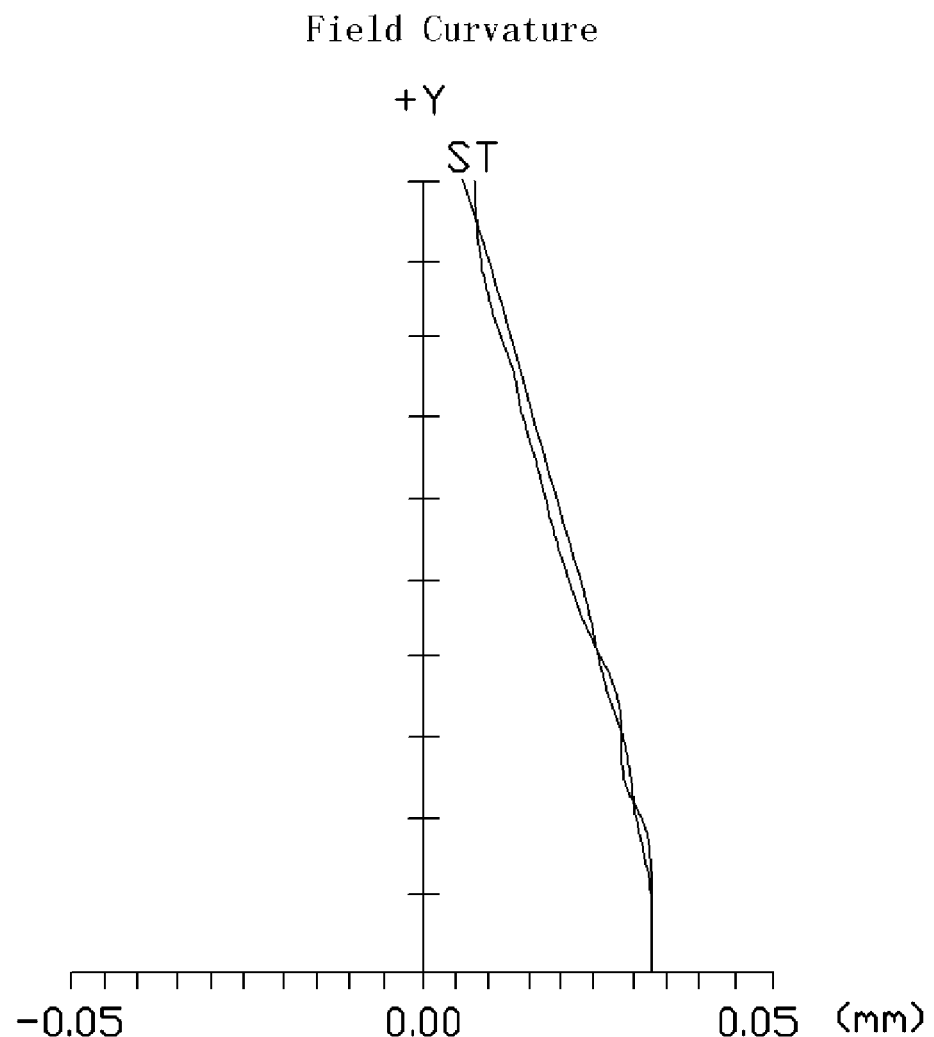
Figure 4:
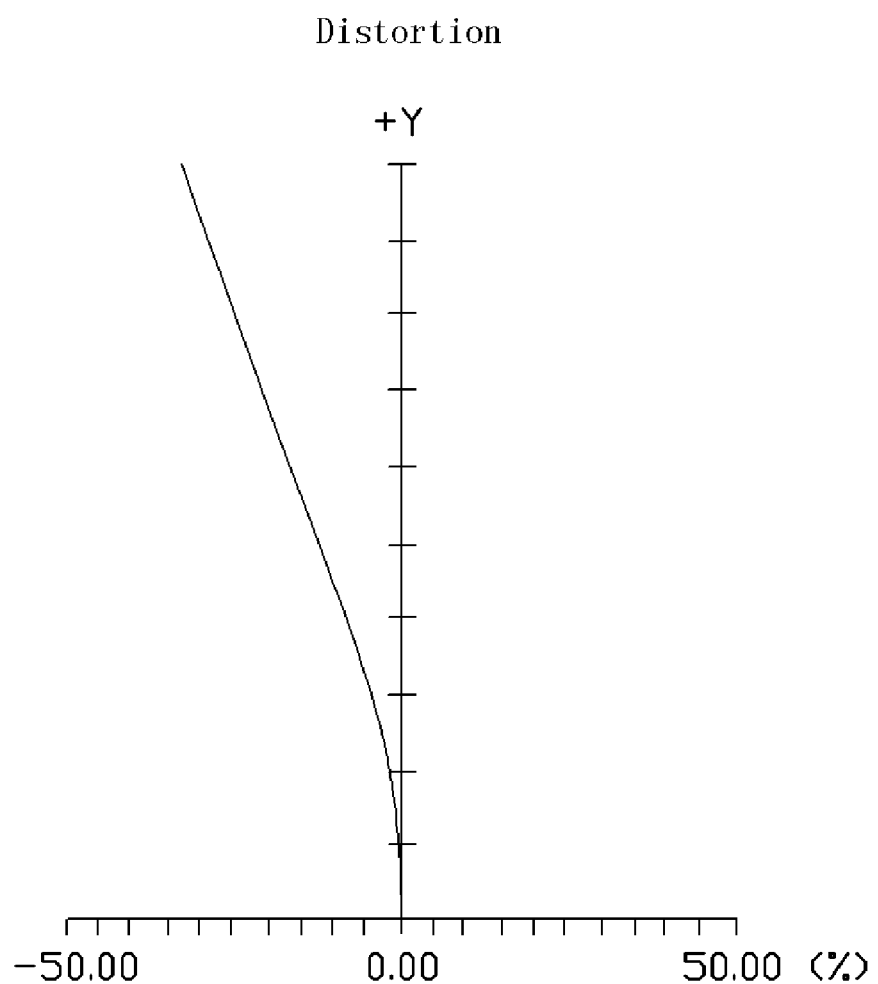

As illustrated in FIG. 2, the curves g, F, e, d, and C are respective spherical aberration characteristic curves of g light (wavelength: 435.8 nm), F light (wavelength: 486.1 nm), d light (wavelength: 587.6 nm), e light (wavelength: 546.1 nm), and C light (wavelength: 656.3 nm) occurring in the lens system 100 of this embodiment. Obviously, spherical aberration of visible light (400-700 nm) occurring in the lens system 100 of this embodiment is in a range of: −0.2 mm~0.2 mm. In FIG. 3, the curves T and S are the tangential field curvature curve and the sagittal field curvature curve, respectively. Clearly, field curvature occurring in the lens system 100 of this embodiment is limited to a range of: −0.05 mm~0.05 mm. In FIG. 4, distortion occurring in the lens system 100 of this embodiment is limited within the range of: −50%~50%.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A lens system, in order from the subject side to the image side thereof, comprising:

a first lens group of negative refractive power comprising a first spherical lens, a second spherical lens, and a third spherical lens from the subject side to the image side of the lens system, wherein the first spherical lens comprises a first subject-side surface facing the subject side of the lens system and a first image-side surface facing the image side of the lens system;

a second lens group of positive refractive power; and an image plane;

the lens system satisfying the following formula: $8.9 < D/F_0 < 9.9$, where D is the length between an apex point of the first subject-side surface and the image plane along the optical axis of the lens system, $F_0$ is the effective focal length of the lens system.

2. The lens system of claim 1, further satisfying the following formula: $0.8 < F_0/|F_{G1}| < 0.9$, where $F_{G1}$ is the effective focal length of the first lens group.

3. The lens system of claim 1, further satisfying the following formula: $3.5 < |F_{L2}/F_0| < 4.5$, where $F_{L2}$ is the effective focal length of the second spherical lens.

4. The lens system of claim 1, wherein the first spherical lens has negative refractive power, the second spherical lens has negative refractive power, the third spherical lens has negative refractive power.

5. The lens system of claim 1, wherein the lens system further comprises an infrared cut filter positioned between the second lens group and the image plane.

6. The lens system of claim 1, wherein the second lens group comprises a fourth spherical lens, a fifth spherical lens, and a sixth spherical lens in order from the subject side to the image side of the lens system.

7. The lens system of claim 6, further satisfying the following formula: $v5−v6>35$, where v5 is the Abbe number of the fifth spherical lens, v6 is the Abbe number of the sixth spherical lens.

8. The lens system of claim 7, wherein the fifth lens comprises a fifth image-side surface, the sixth lens comprises a sixth subject-side surface adhered together with the fifth image-side surface.

9. The lens system of claim 6, wherein the fourth spherical lens has positive refractive power, the fifth spherical lens has positive refractive power, the sixth spherical lens has negative refractive power.

10. The lens system of claim 9, wherein the lens system further comprises an aperture stop positioned between the third spherical lens and the fourth spherical lens.

11. The lens system of claim 10, wherein the fourth spherical lens comprises a fourth subject-side surface facing the subject side of the lens system, the aperture stop positioned on the fourth subject-side surface.

* * * * *